US010013121B2

(12) United States Patent
Wang et al.

(10) Patent No.: US 10,013,121 B2
(45) Date of Patent: Jul. 3, 2018

(54) IN-CELL TOUCH PANEL AND DISPLAY DEVICE WITH SELF-CAPACITANCE ELECTRODES (71) Applicants: BOE Technology Group Co., Ltd., Beijing (CN); BEIJING BOE OPTOELECTRONICS TECHNOLOGY CO., LTD., Beijing (CN)

(72) Inventors: Haisheng Wang, Beijing (CN); Xue Dong, Beijing (CN); Hailin Xue, Beijing (CN); Yingming Liu, Beijing (CN); Xiaoliang Ding, Beijing (CN); Shengji Yang, Beijing (CN); Weijie Zhao, Beijing (CN); Hongjuan Liu, Beijing (CN); Tao Ren, Beijing (CN)

(73) Assignees: BOE Technology Group Co., Ltd., Beijing (CN); Beijing BOE Optoelectronics Technology Co., Ltd., Beijing (CN)

(*) Notice: Subject to any disclaimer, the term of this patent is extended or adjusted under 35 U.S.C. 154(b) by 229 days.

(21) Appl. No.: 14/422,522

(22) PCT Filed: Jul. 11, 2014

(86) PCT No.: PCT/CN2014/082043
§ 371 (c)(1),
(2) Date: Feb. 19, 2015

(87) PCT Pub. No.: WO2015/113380
PCT Pub. Date: Aug. 6, 2015

(65) Prior Publication Data
US 2016/0018922 A1    Jan. 21, 2016

(30) Foreign Application Priority Data
Jan. 28, 2014  (CN) .......................... 2014 1 0041369

(51) Int. Cl.
G06F 3/041    (2006.01)
G06F 3/044    (2006.01)
(Continued)

(52) U.S. Cl.
CPC .......... *G06F 3/044* (2013.01); *G02F 1/13338* (2013.01); *G06F 3/0412* (2013.01);
(Continued)

(58) Field of Classification Search
CPC .............. G06F 3/0412; G06F 3/044; G06F 2203/04103; G06F 2203/04112; G06F 2203/04111; G06F 3/041; G06F 3/045
See application file for complete search history.

(56) References Cited

U.S. PATENT DOCUMENTS

2008/0062140 A1* 3/2008 Hotelling ............. G09G 3/3648
345/173
2009/0102814 A1* 4/2009 Lin ........................ G06F 3/044
345/174
(Continued)

FOREIGN PATENT DOCUMENTS

CN    102929031 A    2/2013
CN    102955636 A    3/2013
(Continued)

OTHER PUBLICATIONS

May 16, 2016—(KR)—Office Action Appn 10-2015-7013320 with English Tran.
(Continued)

Primary Examiner — Pegeman Karimi
(74) Attorney, Agent, or Firm — Banner & Witcoff, Ltd.

(57) ABSTRACT

An in-cell touch panel and a display device are provided. The touch panel includes: an upper substrate and a lower substrate provided opposite to each other, a plurality of self-capacitance electrodes which are disposed between the
(Continued)

upper substrate and the lower substrate and provided in a same layer and insulated from each other, and a touch detection chip configured to determine a touch position by detecting capacitance variation of the self-capacitance electrodes in the touch time-period. Thus, an in-cell touch panel with higher touch accuracy, lower cost, higher productivity and higher transmittance can be obtained.

20 Claims, 10 Drawing Sheets

(51) Int. Cl.
G02F 1/1333 (2006.01)
G09G 3/36 (2006.01)
G02F 1/1335 (2006.01)

(52) U.S. Cl.
CPC ............... G02F 1/133512 (2013.01); G06F 2203/04103 (2013.01); G06F 2203/04111 (2013.01); G06F 2203/04112 (2013.01); G09G 3/36 (2013.01)

(56) References Cited

U.S. PATENT DOCUMENTS

| | | | |
|---|---|---|---|
| 2010/0001973 A1* | 1/2010 | Hotelling | G02F 1/13338 345/174 |
| 2011/0291961 A1 | 12/2011 | Hsieh et al. | |
| 2012/0229395 A1* | 9/2012 | Shin | G06F 3/0418 345/173 |
| 2013/0050107 A1* | 2/2013 | Xie | G06F 3/044 345/173 |
| 2013/0278513 A1* | 10/2013 | Jang | G06F 3/044 345/173 |
| 2013/0314371 A1* | 11/2013 | Lee | G06F 3/0412 345/174 |
| 2013/0341651 A1* | 12/2013 | Kim | H01L 31/0232 257/84 |
| 2014/0009438 A1 | 1/2014 | Liu et al. | |
| 2014/0118283 A1 | 5/2014 | Wang et al. | |
| 2014/0118299 A1 | 5/2014 | Wang et al. | |
| 2014/0152917 A1* | 6/2014 | Lee | G06F 3/044 349/12 |
| 2014/0168138 A1 | 6/2014 | Kuo et al. | |
| 2014/0211102 A1* | 7/2014 | Kang | G06F 3/041 349/12 |
| 2014/0267945 A1* | 9/2014 | Lee | G06F 3/044 349/12 |
| 2014/0313435 A1* | 10/2014 | Cho | H01J 9/20 349/12 |
| 2014/0353691 A1* | 12/2014 | Lee | H01L 27/323 257/88 |
| 2015/0036064 A1* | 2/2015 | Zhou | G06F 3/0412 349/12 |
| 2015/0060252 A1* | 3/2015 | Wang | H03K 17/9622 200/5 R |
| 2015/0153875 A1* | 6/2015 | Zhang | G06F 3/044 345/174 |
| 2015/0185903 A1* | 7/2015 | Park | G06F 3/044 345/173 |
| 2015/0185917 A1* | 7/2015 | Song | G06F 3/044 345/174 |
| 2016/0188031 A1* | 6/2016 | Wang | G06F 3/044 345/174 |
| 2016/0266677 A1* | 9/2016 | Liu | G02F 1/1333 |

FOREIGN PATENT DOCUMENTS

| | | |
|---|---|---|
| CN | 202939388 U | 5/2013 |
| CN | 103176674 A | 6/2013 |
| CN | 103186304 A | 7/2013 |
| CN | 103279245 A | 9/2013 |
| CN | 103294322 A | 9/2013 |
| CN | 103353819 A | 10/2013 |
| CN | 203311397 U | 11/2013 |
| CN | 103793120 A | 5/2014 |
| EP | 2141573 A2 | 1/2010 |
| JP | 2009211531 A | 9/2009 |
| JP | 2011527787 A | 11/2011 |
| KR | 1020070045618 | 10/2005 |
| KR | 1020130130654 | 5/2013 |
| KR | 1020140143314 A | 12/2014 |
| KR | 1020150075723 A | 7/2015 |

OTHER PUBLICATIONS

Jul. 27, 2016—(CN)—Second Office Action Appn 201410041369.7 with English Tran.
Aug. 2, 2016—International Preliminary Report on Patentability Appn PCTCN2014082043.
International Search Report and Written Opinion dated Oct. 27, 2014 (PCT/CN2014/082043); ISA/CN.
Mar. 2, 2016—(CN)—First Office Action Appn 201410041369.7 with English Tran.
Nov. 3, 2016—(KR) Notice of Allowance Appn 10-2015-7013320.
Jul. 27, 2017—(EP) Extended European Search Report Appn 14851431.8.
Mar. 9, 2018—(JP) First Office Action Appn 2016-565532 with English Tran.

* cited by examiner

IN-CELL TOUCH PANEL AND DISPLAY DEVICE WITH SELF-CAPACITANCE ELECTRODES

The application is a U.S. National Phase Entry of International Application No. PCT/CN2014/082043 filed on Jul. 11, 2014, designating the United States of America and claiming priority to Chinese Patent Application No. 201410041369.7 filed on Jan. 28, 2014. The present application claims priority to and the benefit of the above-identified applications and the above-identified applications are incorporated by reference herein in their entirety.

TECHNICAL FIELD

Embodiments of the present disclosure relate to an in-cell touch panel and a display device.

BACKGROUND

With the rapid development of display technology, touch screen panels have been gradually widely applied in people' lives. Currently, in view of structures, touch screen panels can be divided into: add-on mode touch panels, on-cell touch panels and in-cell touch panels. An add-on mode touch panel involves separately producing a touch screen and a liquid crystal display (LCD) which are hence bonded together to form a liquid crystal display with touch function. The on-cell touch panel has the defects of high manufacturing cost, low light transmittance, thick module and the like. In-cell touch panel involves embedding a touch electrode of a touch screen into an liquid crystal display, not only can reduce the overall thickness of module but also can greatly reduce the manufacturing cost of the touch panel, and is favored by main panel manufacturers.

Figure 1:
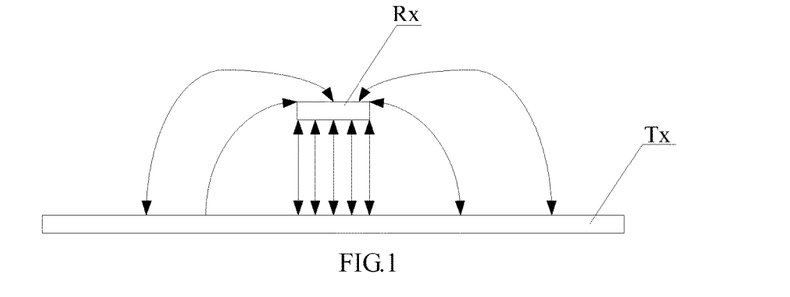
FIG. 1 is a schematic view illustrating capacitances produced between a touch drive electrode and a touch sensing electrode.

Currently, a capacitive in-cell touch panel is obtained by directly separately adding touch drive electrodes and touch sensing electrodes on a thin-film transistor (TFT) array substrate. That is to say, two layers of indium tin oxide (ITO) strip electrodes intersected with each other on different planes are formed on a surface of the TFT array substrate. The two layers of ITO electrodes are respectively taken as touch drive electrodes and touch sensing electrodes of the touch panel. As illustrated in FIG. 1, touch drive electrodes Tx arranged horizontally and touch sensing electrodes Rx arranged vertically are coupled to produce a mutual capacitance Cm. When a finger touches a screen, the touch of the finger can change the value of the mutual capacitance Cm. Subsequently, a touch detection device detects the position of the touch point of the finger by detecting the variation of the current that the capacitance Cm corresponds to before and after the finger touch.

Two kinds of mutual capacitance Cm can be produced between the touch drive electrodes Tx arranged horizontally and the touch sensing electrodes Rx arranged vertically. As illustrated in FIG. 1, one is projective capacitance (curves with arrows in FIG. 1 refer to projective capacitance), which is effective in achieving the touch function, and the projective capacitance value can be changed when the finger touches the screen; and the other is opposing capacitance (straight lines with arrows refer to opposing capacitance), which is ineffective in achieving the touch function, and the opposing capacitance value can not be changed when the finger touches the screen.

SUMMARY

Embodiments of the present disclosure provide an in-cell touch panel and a display device, to achieve an in-cell touch panel with high touch accuracy, low cost, high productivity and high transmittance.

At least one embodiment of the present disclosure provides an in-cell touch panel, which includes a touch detection chip, an upper substrate and a lower substrate provided opposite to each other, and a plurality of self-capacitance electrodes which are disposed between the upper substrate and the lower substrate and provided in a same layer and insulated from each other.

At least one embodiment of the present disclosure provides a display device, which includes the above-mentioned in-cell touch panel provided by the embodiment of the present disclosure.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which is to be within the scope of the disclosure.

The inventors of the application found that: in the structural design of the capacitive in-cell touch panel adopting mutual capacitance as shown in FIG. 1, the human-body capacitance can couple with the projective capacitance in the mutual capacitance; the signal-to-noise ratio of the touch panel can be reduced due to the opposing capacitance formed at positions where surfaces of the touch drive electrode and the touch sensing electrode are directly opposite to each other; and hence the touch sensing accuracy of the in-cell touch panel can be affected. Moreover, in the above-mentioned structure, two layers is separately added on the TFT array substrate. Thus, additional processes is added in manufacturing the TFT array substrate, and hence the manufacturing cost wise increased, which is not conducive to improving the productivity.

Detailed description will be given to the specific implementations of the in-cell touch panel and the display device, provided by embodiments of the present disclosure, with reference to the accompanying drawings.

The thicknesses and shapes of all the layers in the accompanying drawings do not reflect the true scale and are only intended to illustrate the content of the present disclosure.

Figure 2:
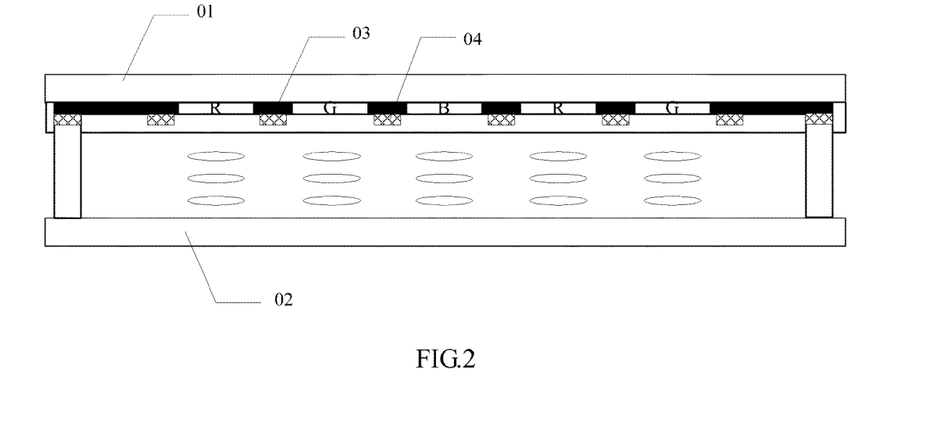
FIG. 2 is a schematic structural view of an in-cell touch panel provided by an embodiment of the present disclosure.

An embodiment of the present disclosure provides an in-cell touch panel. As illustrated in FIG. 2, the in-cell touch panel includes: an upper substrate 01 and a lower substrate 02 arranged opposite to each other, a plurality of self-capacitance electrodes 04 which are disposed between the upper substrate 01 and the lower substrate 02 and provided in a same layer and insulated from each other, and a touch detection chip (not shown in the figure) configured to determine a touch position by detecting a capacitance variation of each self-capacitance electrode in a touch time-period.

In the above-mentioned in-cell touch panel provided by the embodiment of the present disclosure, the plurality of self-capacitance electrodes 04 arranged in the same layer and insulated from each other is disposed between the upper substrate 01 and the lower substrate 02 of the touch panel by utilization of the self-capacitance principle. Description is given herein by taking the case, as illustrated in FIG. 2, that a black matrix layer 03 and the self-capacitance electrodes 04 are both arranged on a side of the upper substrate 01 facing the lower substrate 02 as an example. Of course, the black matrix layer 03 and the self-capacitance electrodes 04 may be also disposed on the lower substrate 02. No further description will be given herein. When the human body does not touch a screen, the capacitance of a self-capacitance electrode 04 is a fixed value. When the human body touches the screen, the capacitance of the corresponding self-capacitance electrode 04 is equal to a fixed value added with the human-body capacitance. The touch detection chip can determine the touch position by detecting the capacitance variation of each self-capacitance electrode 04. Because the human-body capacitance can be applied to the whole self-capacitance, compared with the case that the human-body capacitance can only act on the projective capacitance in the mutual capacitance, the touch variation caused by the touch of a human body to the screen is relatively large. Thus, the signal-to-noise ratio of touch can be effectively increased, and hence the touch sensing accuracy can be improved.

For instance, in order to effectively detect the capacitance variation of each self-capacitance electrode 04, the touch detection chip may apply drive signals to the self-capacitance electrodes 04 in the touch time-period and receive feedback signals of the self-capacitance electrodes 04. Because the RC delay of a feedback signal can be increased due to the capacitance variation of the self-capacitance electrode 04 caused by touch, whether a self-capacitance electrode 04 is touched can be determined by determining the RC delay of the feedback signals of the self-capacitance electrodes 04, and hence the touch position can be determined. Of course, the touch detection chip may also determine the touch position by determining the capacitance variation of the self-capacitance electrodes 04 via the detection of the variation of electric charges and the like. Detailed descriptions are omitted herein.

In order to reduce the mutual interference between display signals and touch signals and hence improve the image quality and the touch accuracy, in the touch panel provided by an embodiment of the present disclosure, time-sharing driving method may be also adopted in the touch period and the display period. Moreover, for instance, a display drive chip and the touch detection chip may be also integrated into a chip to further reduce the manufacturing cost.

Figure 3:
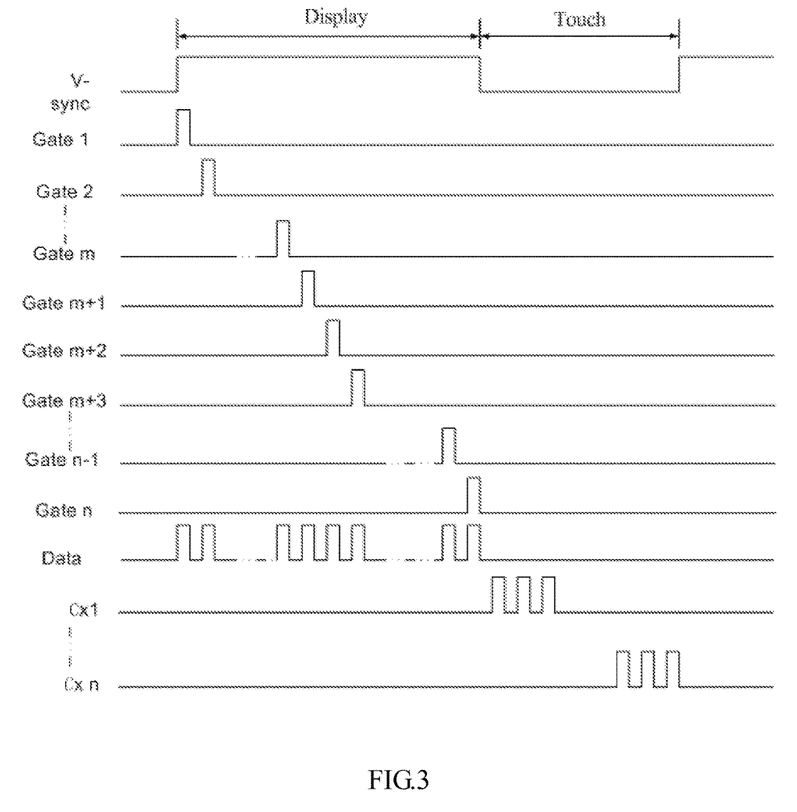
FIG. 3 is a drive timing diagram of an in-cell touch panel provided by an embodiment of the present disclosure.

For instance, in the drive timing diagram as shown in FIG. 3, the time-period for displaying each frame (V-sync) of the touch panel is divided into a display time-period (Display) and a touch time-period (Touch). For instance, in the drive timing diagram as shown in FIG. 3, the time-period for displaying one frame of the touch panel is 16.7 ms, 5 ms of which is selected as the touch time-period, and the rest 11.7 ms is taken as the display time-period. Of course, the duration of the display time-period and the touch time-period may be also appropriately adjusted according to the processing capability of an integrated circuit (IC) chip, limited descriptions are omitted in the embodiment of the present disclosure. In the display time-period (Display), a gate scanning signal is applied to each gate signal line Gate 1, Gate 2 . . . Gate n in the touch panel in sequence, and gray-scale signals are applied to data signal lines Data, so as to realize the liquid crystal display (LCD) function. In the touch time-period (Touch), the touch detection chip connected with the self-capacitance electrodes Cx1 . . . Cxn applies drive signals to the touch drive electrodes Cx1 . . . Cxn respectively, simultaneously receives feedback signals of the self-capacitance electrodes Cx1 . . . Cxn, and determines whether there is touch by analyzing the feedback signals, and determine whether a touch occurs by analyzing the feedback signals, so as to achieve the touch function.

In the in-cell touch panel provided by embodiments of the present disclosure, the self-capacitance electrodes 04 disposed between the upper substrate 01 and the lower substrate 02 may be arranged in a same layer. Thus, compared with the method of adding two layers in the array substrate when the mutual-capacitance principle is used to achieve the touch function, the touch function can be achieved by only adding one layer of self-capacitance electrodes 04 in the touch panel provided by the embodiments of the present disclosure, and hence the manufacturing cost is reduced and the productivity is improved.

In an example, as illustrated in FIG. 2, the in-cell touch panel provided by the embodiment of the present disclosure may further include a black matrix layer 03 disposed between the upper substrate 01 and the lower substrate 02. Moreover, an orthographic projection of a pattern of each self-capacitance electrode 04 on the lower substrate 02 may be disposed in an area provided with a pattern of the black matrix layer 03.

In the example, all the patterns of the self-capacitance electrodes 04 are disposed in the areas provided with the pattern of the black matrix layer 03. The electrical field produced by the self-capacitance electrodes can not affect the electrical field in pixel opening areas. Thus, normal display can not be affected. Moreover, the self-capacitance electrodes arranged in shielding areas of the pattern of the black matrix layer can further prevent the self-capacitance electrodes 04 from affecting the transmittance of the touch panel.

Figure 4:
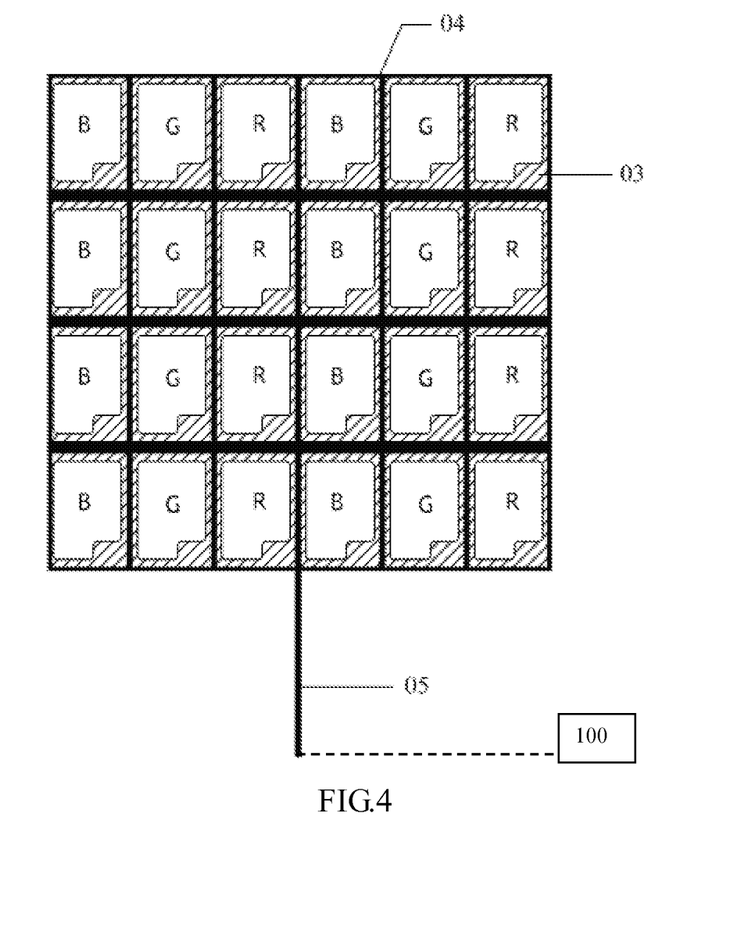
FIG. 4 is a schematic structural view of a self-capacitance electrode in an in-cell touch panel provided by an embodiment of the present disclosure.

The density of the touch panel is generally in millimeter. Thus, in one example, the density and the area of each self-capacitance electrode 04 may be selected according to the required touch density, so as to ensure the required touch density. In general, each self-capacitance electrode 04 is designed to be a square electrode with a size of about 5 mm*5 mm. The density of a display screen is generally in micrometer. Thus, one self-capacitance electrode 04 may generally correspond to a plurality of pixel units in the display screen. In order to ensure that the patterns of the self-capacitance electrodes 04 do not occupy opening areas of the pixel units, as illustrated in FIG. 4, in one embodiment, the pattern of each self-capacitance electrode 04, at a position corresponding to the opening area of a pixel unit (a hollow area in a pixel region) may be hollow. That is to say, the pattern of each self-capacitance electrode 04 may be designed to be that the orthographic projection of the pattern, on the lower substrate 02, is of a latticed structure, located in the area provided with the pattern of the black matrix layer 03. Moreover, in order to ensure the display uniformity, a gap of each sub-pixel unit of respective pixel units is generally provided with the pattern of the self-capacitance electrode 04. In FIG. 4, each group of RGB sub-pixel units are integrated into a pixel unit. The density stated in the embodiment of the present disclosure refers to the pitch between the self-capacitance electrodes of the touch panel or the pitch between the pixel units of the display screen.

Figure 5A:
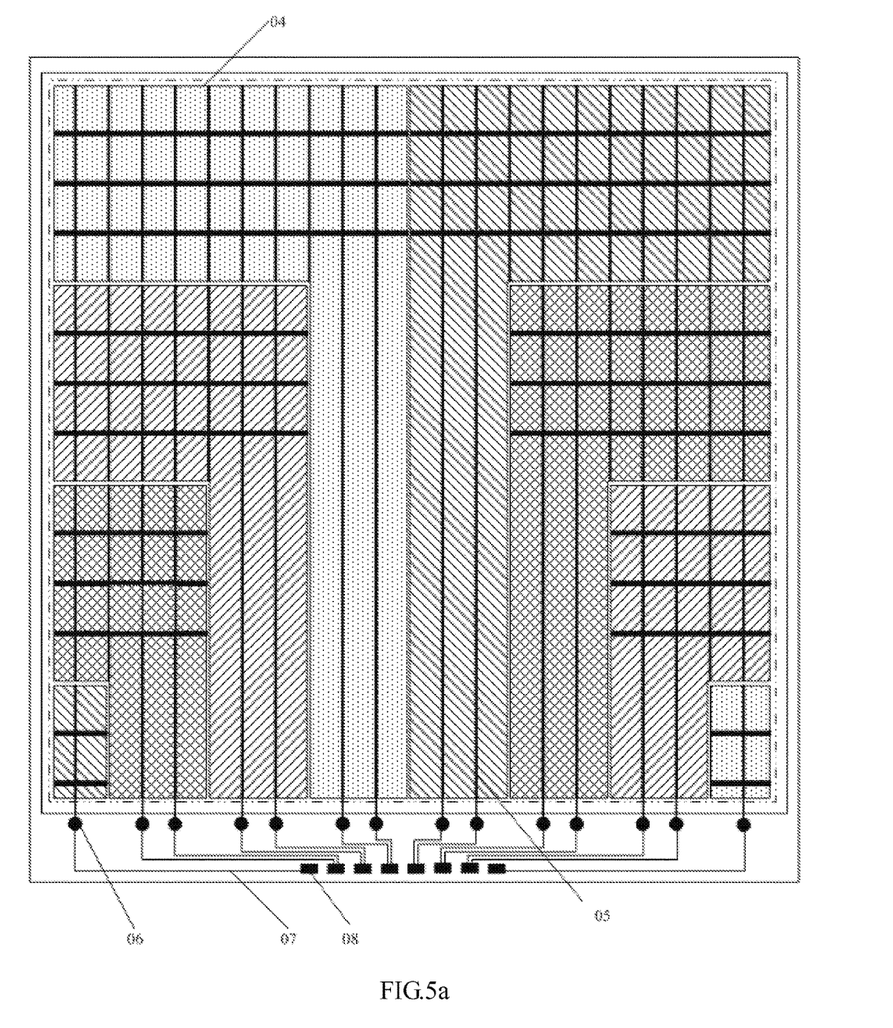
FIG. 5a is a schematic view of conductive wires and self-capacitance electrodes, provided in a same layer and adopting a wiring method, in an in-cell touch panel provided by an embodiment of the present disclosure.

In order to make it easy for the touch detection chip to detect the capacitance variation of each self-capacitance electrode, as illustrated in FIG. 5a, the in-cell touch panel provided by one embodiment of the present disclosure may further include: conductive wires 05 respectively correspond to the self-capacitance electrodes 04, and conduction nodes 06 respectively correspond to the self-capacitance electrodes 04. Each conduction node 06 may be disposed in an area provided with a sealant frame of the in-cell touch panel. In order to not affect normal display function, an orthographic projection of each conductive wire 05 on the lower substrate 02 is also disposed in the area provided with the pattern of the black matrix layer 03. Each self-capacitance electrode 04 is electrically connected with a connection terminal 08 of the touch detection chip through a leading wire 07 disposed in the area provided with the sealant frame, after being connected to a conduction node 06 through a conductive wire 05. FIG. 5a illustrates the case of arranging 8 self-capacitance electrodes in one row. The number of the conductive wire 05 and the conduction node 06 respectively correspond to the self-capacitance electrode 04 may be one or may also be multiple. No limitations are imposed thereto. The conductive wire 05 is connected to the touch detection chip 100. The touch detection chip 100, for instance, may be disposed on one substrate or disposed on a flexible printed circuit board.

For instance, the conductive wire 05 and the conduction node 06 are generally disposed on the same substrate with the self-capacitance electrode 04, namely the conductive wire 05, the conduction node 06 and the self-capacitance electrode 04 may be all disposed on the upper substrate or may also be all disposed on the lower substrate; and the leading wire 07 and the connection terminal 08 of the touch detection chip are generally disposed on the lower substrate. When the conductive wire 05, the conduction node 06 and the self-capacitance electrode 04 are disposed on the upper substrate, the conduction node 06 can be electrically connected with the leading wire 07 disposed in the area provided with the sealant frame of the lower substrate through the upper-to-lower conduction function of a conducting particle (e.g., a gold ball) in the sealant frame, and subsequently be electrically connected to corresponding connection terminal 08 of the touch detection chip through the leading wire 07. When the conductive wire 05, the conduction node 06 and the self-capacitance electrode 04 are disposed on the lower substrate, the conduction node 06 is directly electrically connected with the leading wire 07 disposed in the area provided with the sealant frame of the lower substrate, and subsequently is electrically connected to corresponding connection terminal 08 of the touch detection chip through the leading wire 07.

Figure 5B:
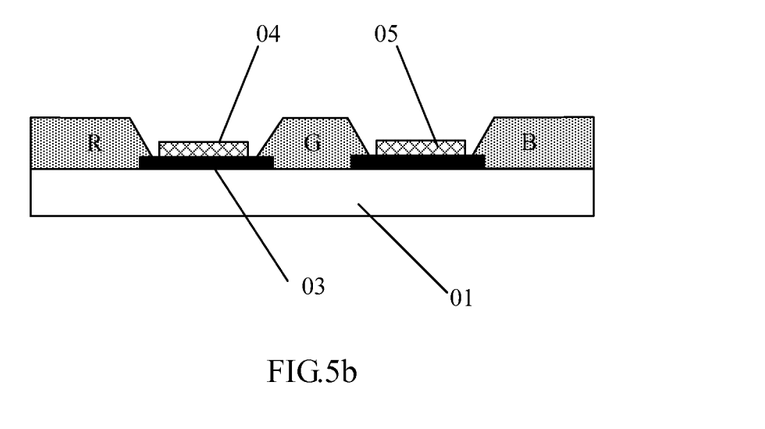
FIG. 5b is a schematic view of conductive wires and self-capacitance electrodes, provided in a same layer, in an in-cell touch panel provided by an embodiment of the present disclosure.

In one example, in order to reduce the number of layers and patterning processes in the touch panel as much as possible, the conductive wires 05 and the self-capacitance electrodes 04 may be provided in the same layer. As illustrated in FIG. 5b, both the conductive wire 05 and the self-capacitance electrode 04 are disposed between the black matrix layer 03 and a color filter layer RGB of the upper substrate 01. However, because the patterns of the self-capacitance electrodes 04 and the conductive wires 05 are designed by one metal layer, in order to avoid the phenomenon of short circuit between the self-capacitance electrodes 04, the conductive wires 05 connected with the self-capacitance electrodes 04 respectively are to be not intersected with each other. Therefore, when the conductive wires 05 are designed using the wiring method as shown in FIG. 5a, namely all the conductive wires 05 connected with the self-capacitance electrodes 04 extend along one direction and connected to corresponding conduction nodes 06 disposed in the region of a same side, a dead touch zone occurs in the touch panel. FIG. 5a illustrates a dead touch area formed by 8 self-capacitance electrodes 04 in one row. It is to be noted that: FIG. 5a only illustrates the patterns of the self-capacitance electrodes 04 and the patterns of the conductive wires 05 connected with the self-capacitance electrodes 04 and does not illustrate patterns of sub-pixel units; and moreover, for the convenience of observation, different filling patterns in FIG. 5a illustrate areas where the self-capacitance electrodes 04 are located respectively. All the conductive wires 05, connected with the plurality of self-capacitance electrodes, in the dead touch area, run through the dead touch area. Thus, signals in the dead touch area are relatively disordered, and hence the area is referred to as the dead touch area, namely the touch performance in the area cannot be guaranteed.

In order to reduce the area of the dead touch area as much as possible, four sides of the area provided with the sealant frame of the in-cell touch panel can be provided with the conduction nodes 06, namely the conduction nodes 06 are distributed on all the four sides of the area provided with the sealant frame. Thus, the self-capacitance electrodes 04 are respectively connected to corresponding conduction nodes 06, disposed on the periphery of a display area, through the conductive wires 05, and hence the area of the dead touch area can be reduced on the whole.

Figure 6:
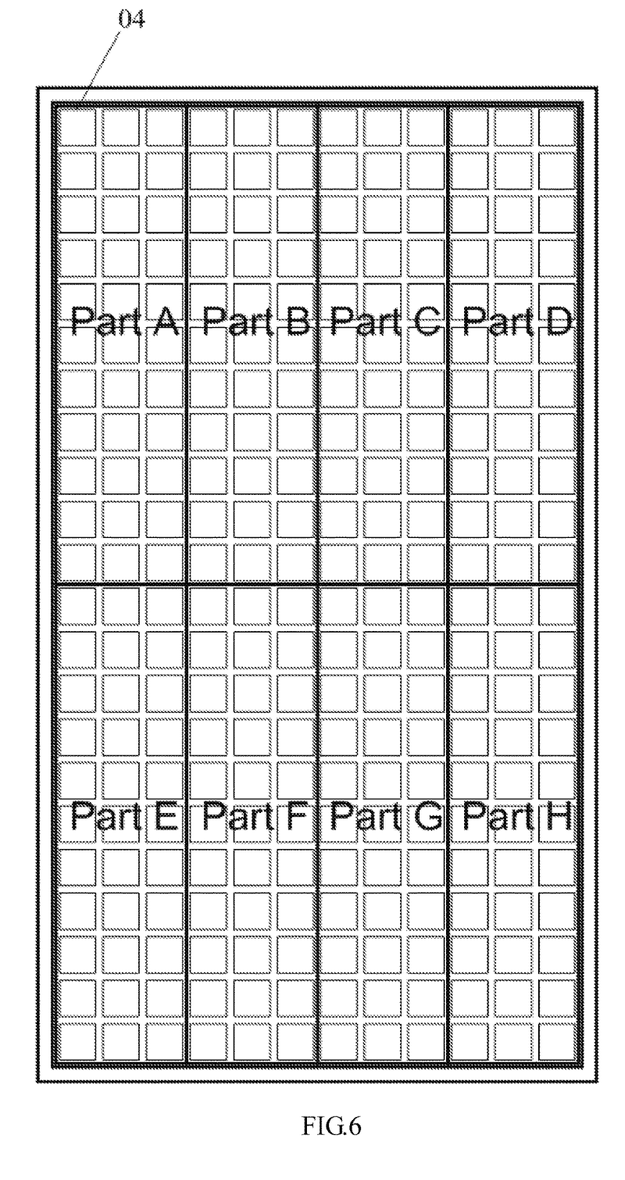
FIG. 6 is a partition view of self-capacitance electrodes in a display area of an in-cell touch panel provided by an embodiment of the present disclosure.
Figure 7:
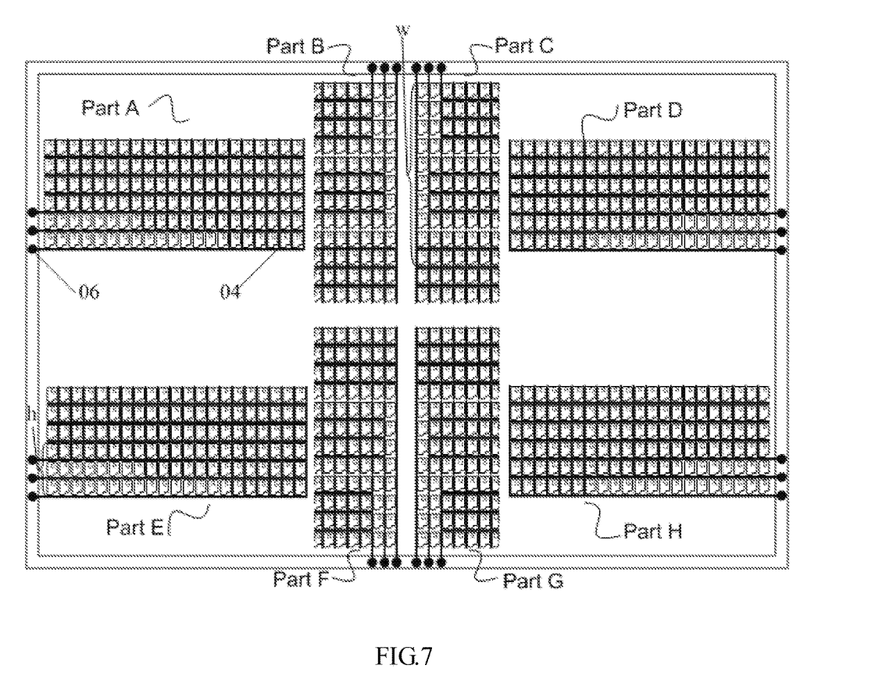
FIG. 7 is a view illustrating a connection between self-capacitance electrodes and conduction nodes, provided in a same layer, in areas of an in-cell touch panel provided by an embodiment of the present disclosure.

Description is given to the design of reducing the area of the dead touch area, provided by the embodiment of the present disclosure, by taking a 5-inch touch panel as an example. In the 5-inch touch panel, the number of the required self-capacitance electrodes is about 22*12=264. As illustrated in FIG. 6, in order to lead each self-capacitance electrode 04 to corresponding conduction node 06 and reduce the area of the dead touch area as much as possible, all the self-capacitance electrodes 04 may be divided into 8 areas, namely Part A to Part H, and the self-capacitance electrodes 04 in each area are connected to connection terminals (FPC bonding pads) 08 of the touch detection chip below the display area (Panel) one by one. As illustrated in FIG. 7, each area in FIG. 7 is provided with 3 self-capacitance electrodes 04; the self-capacitance electrodes in the Part A area are led out from the upper-left region of the display area and then led into the FPC bonding pad from a left border of the display area; the self-capacitance electrodes in the Part B area are led out from the upper part of the display area and then led into the FPC bonding pad from the left border of the display area; the self-capacitance electrodes in the Part C area are led out from the upper part of the display area and then led into the FPC bonding pad from a right border of the display area; the self-capacitance electrodes in the Part D area are led out from the upper right of the display area and then led into the FPC bonding pad from the right border of the display area; similarly, the self-capacitance electrodes in the Part E area are led out from the lower left of the display area and then led into the FPC bonding pad from the left border of the display area; the self-capacitance electrodes of the Part F area are led out from the lower part of the display area and then directly connected to the FPC bonding pad; the self-capacitance electrodes in the Part G area are led out from the lower part of the display area and then directly led into the FPC bonding pad; and the self-capacitance electrodes in the Part H area are led out from the lower right of the display area and then led into the FPC bonding pad from the right border of the display area.

It is to be noted that: for the convenience of observation, FIG. 7 only illustrates the connection relationship between partial self-capacitance electrodes 04 and partial conduction nodes 06. As seen from FIG. 7, the size of the dead touch areas in the Part A, the Part D, the Part E and the Part H on both sides of the display area is approximately equal to the width of 3 sub-pixel units, represented as h in FIG. 7, and as calculated according to the size of corresponding pixel unit in the 5-inch touch panel, the size of the dead touch area is about 260 µm; and the size of the dead touch areas in the Part B, the Part C, the Part F and the Part G in the middle part of the display area is approximately equal to the width of 10 sub-pixel units, represent as w in FIG. 7, and as calculated according to the size of corresponding pixel unit in the 5-inch touch panel, the size of the dead touch area is about 290 µm.

The above-mentioned connection relationship between the self-capacitance electrodes 04 and the conduction nodes 06 is only illustrative and can be designed according to the specific size of the touch panel in actual design. For instance, in order to reduce the area of the dead touch area as much as possible, a conduction node 06 corresponding to a self-capacitance electrode 04 may be distributed on a side, closest to the self-capacitance electrode 04, of the area provided with the sealant frame. Thus, the length of the conductive wire 05 configured to connect the self-capacitance electrode 04 and the conduction node 06 can be reduced as much as possible, and hence the area of the dead touch area can be reduced as much as possible.

Figure 8:
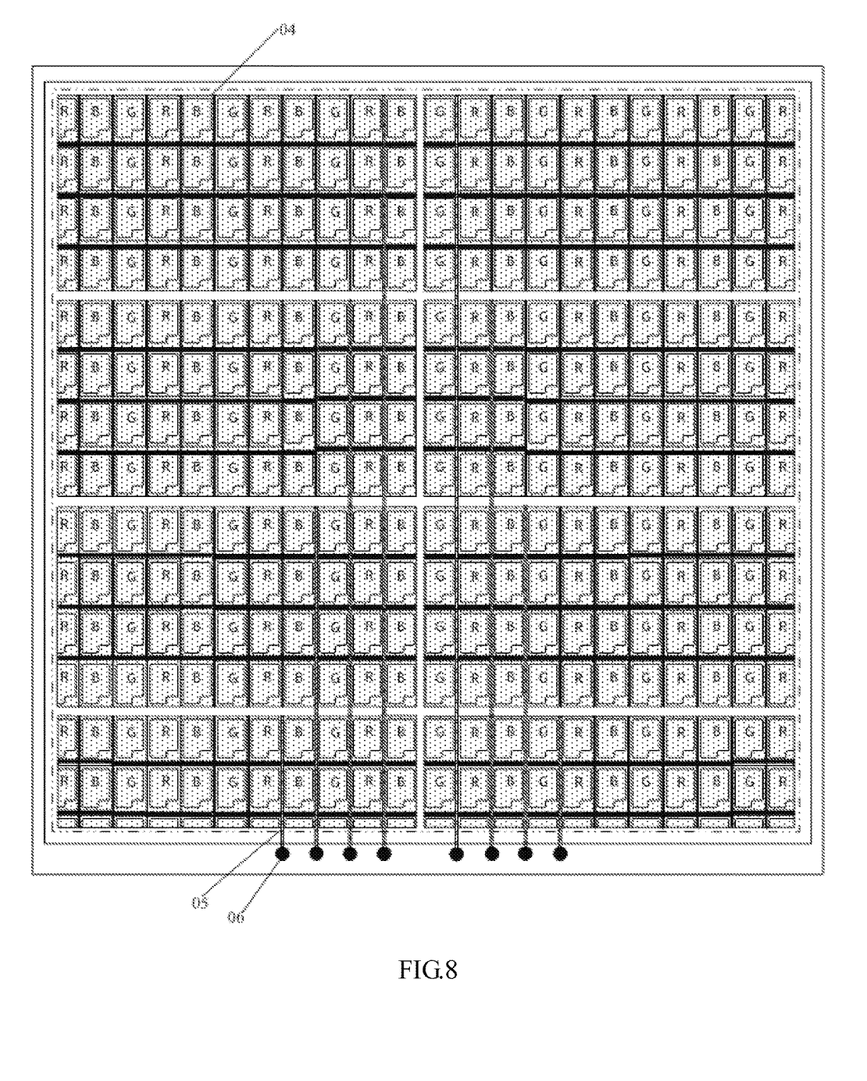
FIG. 8 is a view of a connection between self-capacitance electrodes and conduction nodes, provided in different layers, in areas of an in-cell touch panel provided by an embodiment of the present disclosure.

In one example, in order to eliminate the dead touch areas in the touch panel, the self-capacitance electrodes 04 and the conductive wires 05 can be provided in different layers, and each self-capacitance electrode 04 and the corresponding conductive wire 05 are electrically connected with each other via a through hole. Thus, in the process of designing the connection relationship of conductive wires 05, the wiring method as shown in FIG. 8 may be adopted, namely the conductive wires 05 connected with all the self-capacitance electrodes 04 extend along one direction and connected to corresponding conduction nodes 06 disposed in areas on the same side of the area provided with the sealant frame.

In one example, in the in-cell touch panel provided by the embodiments of the present disclosure, as illustrated in FIG. 2, the black matrix layer 03 may be disposed on one side of the upper substrate 01 facing the lower substrate 02, and a color filter layer (RGB in FIG. 2 represent the color filter layer) may be also disposed on the black matrix layer 03. When the self-capacitance electrodes 04 and the conductive wires 05 are arranged in the same layer, each self-capacitance electrode 04 and each conductive wire 05 may be disposed between the black matrix layer 03 and the color filter layer or disposed on the color filter layer. When the self-capacitance electrodes 04 and the conductive wires 05 are arranged in different layers, in order to reduce the interference of the human-body capacitance to the transmission signal of the conductive wire, the self-capacitance electrodes 04 may be disposed between the black matrix layer 03 and the color filter layer, and the conductive wires 05 is disposed on the color filter layer and correspondingly connected with the self-capacitance electrodes 04 via through holes in the color filter layer. Thus, the self-capacitance electrode 04 can shield the signal interference brought by the conductive wire 05 covered below the self-capacitance electrode 04.

Figure 9A:
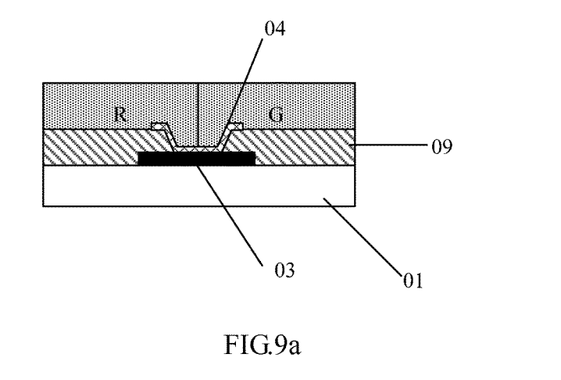
FIGS. 9a and 9b are schematic views respectively illustrating a structure that a self-capacitance electrode is filled into a through hole or a channel of a planarization layer, in an in-cell touch panel provided by an embodiment of the present disclosure.
Figure 9B:
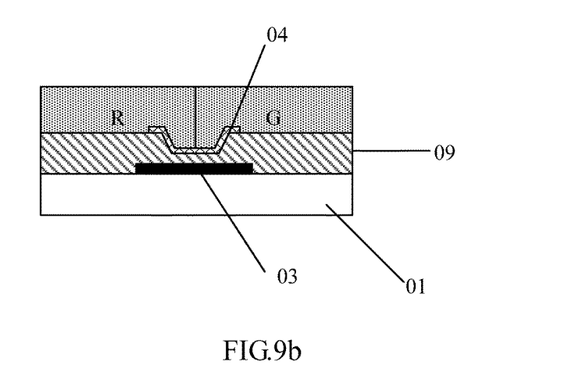

For instance, in the in-cell touch panel provided by embodiments of the present disclosure, because the pattern of each self-capacitance electrode 04 is shielded by the pattern of the black matrix layer 03, the total area of the pattern of the latticed structure of each self-capacitance electrode 04 is limited by the area of the pattern of the black matrix layer 03. In order to increase the area of the pattern of each self-capacitance electrode 04 as much as possible and hence improve the touch sensitivity, in one example, as illustrated in FIGS. 9a and 9b, a planarization layer 09 may be also disposed between the black matrix layer 03 and the color filter layer and is provided with a trapezoidal through hole or a channel at least in an area corresponding to the pattern of the self-capacitance electrode 04. FIG. 9a illustrates that the planarization layer 09 is provided with a trapezoidal through hole in an area corresponding to a pattern of a self-capacitance electrode 04, and FIG. 9b illustrates that the planarization layer 09 is provided with a trapezoidal channel in an area corresponding to a pattern of a self-capacitance electrode 04. The pattern of the self-capacitance electrode 04 is at least filled into the through hole or the channel, and the surface area of the self-capacitance electrode 04 filled into the through hole or the channel is greater than the base area of the trapezoidal through hole or the channel. The area of the pattern of the self-capacitance area 04 can be increased by the above means. Moreover, the self-capacitance electrode 04 disposed in the through hole or the channel has a concave-convex structure, and more charges can be converged on a convex portion seen from the finger side because the convex portion is a top end. In the case of finger touch, the touch variation can be improved, and hence the touch sensing effect can be improved.

In one example, in the in-cell touch panel provided by the embodiments of the present disclosure, because the human-body capacitance acts on the self-capacitance of each self-capacitance electrode 04 by direct coupling, when the human body touches the screen, only the capacitance of the self-capacitance electrode 04 below the touch position has large variation, and the capacitance of self-capacitance electrodes 04 adjacent to the self-capacitance electrode 04 below the touch position has very small variation. Thus, when, for instance, a finger slides on the touch panel, the case that the touch coordinate in the area where a self-capacitance electrode 04 is located cannot be determined may occur. Therefore, in the in-cell touch panel provided by the embodiments of the present disclosure, either opposite sides of two adjacent self-capacitance electrodes 04 can be provided to be a zigzag line, and hence the capacitance variation of the self-capacitance electrodes 04 adjacent to the self-capacitance electrode 04 below the touch position can be increased.

For instance, the entire shape of the self-capacitance electrode 04 may be provided by using one or a combination of the following two means.

Figure 10A:
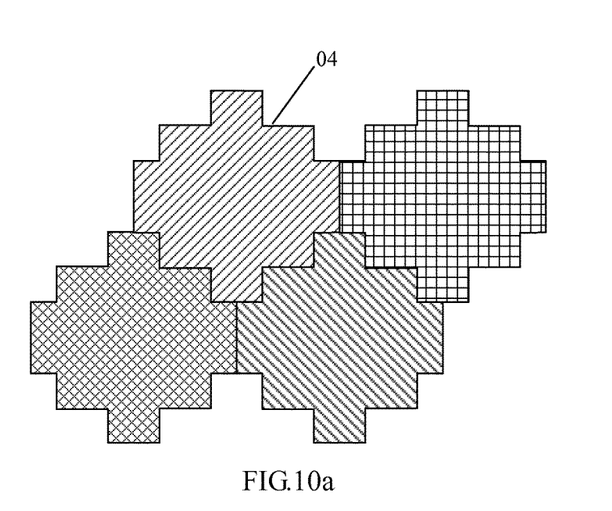
FIGS. 10a and 10b are schematic views respectively illustrating a structure that opposite sides of adjacent self-capacitance electrodes are provided to be zigzag lines, in an in-cell touch panel provided by an embodiment of the present disclosure.

1. Both the opposite sides, being zigzag lines, of the two adjacent self-capacitance electrodes 04 may be provided to be of a stepped structure, and the two stepped structures have conformable shape and are matched with each other, as illustrated in FIG. 10a which illustrates 2*2 self-capacitance electrodes 04.

Figure 10B:
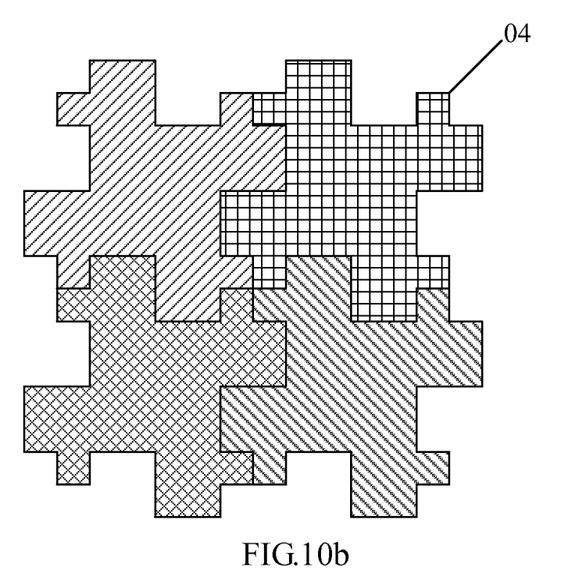

2. Both the opposite sides, being zigzag lines, of the two adjacent self-capacitance electrodes 04 may be provided to be of a concave-convex structure, and the two concave-convex structures have conformable shape and are matched with each other, as illustrated in FIG. 10b which illustrates 2*2 self-capacitance electrodes 04.

Based on the same invention concept, at least one embodiment of the present disclosure further provides a display device, which includes the above-mentioned in-cell touch panel provided by any one of the embodiments of the present disclosure. The display device may be: any product or component with display function such as a mobile phone, a tablet computer, a television, a display, a notebook computer, a digital picture frame and a navigator. The implementations of the display device may refer to the embodiments of the above-mentioned in-cell touch panel. Repeated descriptions are omitted herein.

In the in-cell touch panel and the display device, provided by the embodiments of the present disclosure, the plurality of self-capacitance electrodes arranged in a same layer and insulated from each other is disposed between the upper substrate and the lower substrate of the touch panel by utilization of the self-capacitance principle. When the human body does not touch the screen, the capacitance of each self-capacitance electrode is a fixed value. When the human body touches the screen, the capacitance of the corresponding self-capacitance electrode is equal to a fixed value added with the human-body capacitance. The touch detection chip can determine the touch position by detecting the capacitance variation of the self-capacitance electrode in the touch time-period. Because the human-body capacitance can be applied to the whole self-capacitance, compared with the method that the human-body capacitance can only act on the projective capacitance in the mutual capacitance, the touch variation caused by the touch of a human body to the screen is relatively large. Thus, the signal-to-noise ratio of touch can be effectively increased, and hence the touch sensing accuracy can be improved. Moreover, compared with the case that two additional layers are required to be added in the array substrate when the mutual-capacitance principle is adopted to achieve the touch function, the touch function can be achieved by only adding one layer of self-capacitance electrodes in the touch panel provided by the embodiments of the present disclosure, and hence the manufacturing cost is reduced and the productivity is improved.

Obviously, various variations and modifications can be made to the present disclosure by those skilled in the art without departing from the spirit and scope of the present disclosure. Therefore, if these variations and modifications for the present disclosure fall within the scope of the claims of the present disclosure and equivalents thereof, the present disclosure is also intended to cover these variations and modifications.

The application claims the benefit of Chinese Patent Application No. 201410041369.7, filed on Jan. 28, 2014, which is hereby entirely incorporated by reference.

What is claimed is:

1. An in-cell touch panel, comprising:
a touch detection chip;
an upper substrate and a lower substrate provided opposite to each other;
a plurality of self-capacitance electrodes disposed between the upper substrate and the lower substrate and provided in a same layer and insulated from each other;
a black matrix layer disposed between the upper substrate and the lower substrate; and
a color filter layer disposed on the black matrix layer,
wherein a planarization layer is further disposed between the black matrix layer and the color filter layer, the planarization layer is provided with a trapezoidal through hole at least in an area corresponding to a pattern of each self-capacitance electrode, the pattern of each self-capacitance electrode is at least filled into the trapezoidal through hole, and each self-capacitance electrode is in direct contact with the black matrix layer via a base of the trapezoidal through hole, with the base of the trapezoidal through hole being in direct contact with the black matrix layer.

2. The in-cell touch panel according to claim 1, wherein an orthographic projection of a pattern of each of the self-capacitance electrodes on the lower substrate is disposed in an area provided with a pattern of the black matrix layer.

3. The in-cell touch panel according to claim 2, wherein the orthographic projection of the pattern of each of the self-capacitance electrodes on the lower substrate comprises a latticed structure disposed in the area provided with the pattern of the black matrix layer.

4. The in-cell touch panel according to claim 3, further comprising: conductive wires respectively corresponding to the self-capacitance electrodes, and conduction nodes respectively corresponding to the self-capacitance electrodes, wherein
an orthographic projection of each of the conductive wires on the lower substrate is disposed in the area provided with the pattern of the black matrix layer;
each of the conduction nodes is disposed in an area provided with a sealant frame of the in-cell touch panel; and each of the self-capacitance electrodes is electrically connected with a connection terminal of the touch detection chip through a leading wire in the area provided with the sealant frame, after being connected to the conduction node through the conductive wire.

5. The in-cell touch panel according to claim 2, further comprising: conductive wires respectively corresponding to the self-capacitance electrodes, and conduction nodes respectively corresponding to the self-capacitance electrodes, wherein an orthographic projection of each of the conductive wires on the lower substrate is disposed in the area provided with the pattern of the black matrix layer;

each of the conduction nodes is disposed in an area provided with a sealant frame of the in-cell touch panel; and each of the self-capacitance electrodes is electrically connected with a connection terminal of the touch detection chip through a leading wire in the area provided with the sealant frame, after being connected to the conduction node through the conductive wire.

6. The in-cell touch panel according to claim 5, wherein the conductive wires and the self-capacitance electrodes are provided in a same layer.

7. The in-cell touch panel according to claim 6, wherein the area provided with the sealant frame of the in-cell touch panel has four sides; and the conduction nodes are distributed on all the four sides of the area provided with the sealant frame.

8. The in-cell touch panel according to claim 7, wherein the conduction nodes, to which the self-capacitance electrodes correspond, are distributed on a side, closest to the self-capacitance electrodes, of the area provided with the sealant frame.

9. The in-cell touch panel according to claim 8, wherein
the black matrix layer is disposed on a side of the upper substrate facing the lower substrate; and
the self-capacitance electrodes and the conductive wires are disposed between the black matrix layer and the color filter layer or disposed on the color filter layer.

10. The in-cell touch panel according to claim 7, wherein
the black matrix layer is disposed on a side of the upper substrate facing the lower substrate; and
the self-capacitance electrodes and the conductive wires are disposed between the black matrix layer and the color filter layer or disposed on the color filter layer.

11. The in-cell touch panel according to claim 6, wherein
the black matrix layer is disposed on a side of the upper substrate facing the lower substrate; and
the self-capacitance electrodes and the conductive wires are disposed between the black matrix layer and the color filter layer or disposed on the color filter layer.

12. The in-cell touch panel according to claim 6, wherein the conduction nodes, to which the self-capacitance electrodes correspond, are distributed on a side, closest to the self-capacitance electrodes, of the area provided with the sealant frame.

13. The in-cell touch panel according to claim 5, wherein the conductive wires and the self-capacitance electrodes are provided in different layers; and the self-capacitance electrodes and the corresponding conductive wires are correspondingly electrically connected with each other via through holes.

14. The in-cell touch panel according to claim 13, wherein
the black matrix layer is disposed on a side of the upper substrate facing the lower substrate;
the self-capacitance electrodes are disposed between the black matrix layer and the color filter layer; and
the conductive wires are disposed on the color filter layer and electrically connected with the corresponding self-capacitance electrodes via through holes in the color filter layer.

15. The in-cell touch panel according to claim 1, wherein a surface area of the self-capacitance electrode filled into the trapezoidal through hole is greater than an area of the base of the trapezoidal through hole.

16. The in-cell touch panel according to claim 1, wherein both opposite sides of two adjacent self-capacitance electrodes each comprise a zigzag line.

17. The in-cell touch panel according to claim 16, wherein both the opposite sides, comprising the zigzag line, of the two adjacent self-capacitance electrodes each have a stepped structure, and two stepped structures have a conformable shape and are matched with each other; and/or both the opposite sides, comprising the zigzag line, of the two adjacent self-capacitance electrodes each have a concave-convex structure, and two concave-convex structures have a conformable shape and are matched with each other.

18. The in-cell touch panel according to claim 1, further comprising: a display drive chip, wherein the display drive chip and the touch detection chip are integrated into a chip.

19. A display device, comprising an in-cell touch panel according to claim 1.

20. An in-cell touch panel, comprising:
a touch detection chip;
an upper substrate and a lower substrate provided opposite to each other;
a plurality of self-capacitance electrodes disposed between the upper substrate and the lower substrate and provided in a same layer and insulated from each other;
a black matrix layer disposed between the upper substrate and the lower substrate; and
a color filter layer disposed on the black matrix layer,
wherein a planarization layer is further disposed between the black matrix layer and the color filter layer, the planarization layer is provided with a trapezoidal channel at least in an area corresponding to a pattern of each self-capacitance electrode, and the pattern of each self-capacitance electrode is at least filled into the trapezoidal channel, with each self-capacitance electrode that is filled inside the trapezoidal channel being in direct contact with the planarization layer at a base and two sides of the trapezoidal channel.

* * * * *